United States Patent [19]

Dennis

[11] Patent Number: 4,466,944

[45] Date of Patent: Aug. 21, 1984

[54] PROCESS FOR RECOVERY OF URANIUM FROM WET PROCESS $H_3PO_4$

[75] Inventor: Richard S. Dennis, Lakeland, Fla.

[73] Assignee: International Minerals & Chemical Corp., Terre Haute, Ind.

[21] Appl. No.: 515,750

[22] Filed: Jul. 21, 1983

[51] Int. Cl.³ .............................................. C01G 43/00
[52] U.S. Cl. .......................................... 423/6; 423/10
[58] Field of Search ..................................... 423/10, 6

[56] References Cited

U.S. PATENT DOCUMENTS

| | | | |
|---|---|---|---|
| 4,190,633 | 2/1980 | Smith et al. | 423/10 |
| 4,233,278 | 11/1980 | Korchnak | 423/10 |
| 4,255,392 | 3/1981 | Chiang | 423/10 |
| 4,258,013 | 3/1981 | Pyrih et al. | 423/10 |
| 4,302,427 | 11/1981 | Berry et al. | 423/10 |
| 4,332,776 | 6/1982 | Stana | 423/10 |

OTHER PUBLICATIONS

Hurst et al., "Progress and Problems of Recovering Uranium from Wet-Process Phosphoric Acid", 25 pp., draft (ORNL) of paper presented at the 26th Annual Meeting, Fertilizer Industry Round Table, Atlanta, GA, Oct. 26–28, 1976.

Primary Examiner—Edward A. Miller
Attorney, Agent, or Firm—Robert H. Dewey

[57] ABSTRACT

Aqueous ammonium uranyl tricarbonate strip solution is purified by using activated carbon to remove ammonium di(2-ethylhexyl)phosphate impurity.

2 Claims, No Drawings

PROCESS FOR RECOVERY OF URANIUM FROM WET PROCESS H₃PO₄

This invention relates to the recovery of uranium from wet process phosphoric acid. In a particular aspect, this invention relates to an improvement in the process for recovery of uranium from wet process phosphoric acid.

Phosphate rock deposits mined in central Florida for fertilizer use contain about 140–180 ppm by weight of uranium. When the rock is digested with sulfuric acid to produce phosphoric acid (known as wet process phosphoric acid), the uranium is dissolved and passes into the acid phase. A process for recovery of this uranium by solvent extraction was taught by F. J. Hurst and D. J. Crouse in U.S. Pat. No. 3,711,591. W. W. Berry and A. V. Henrickson, U.S. Pat. No. 4,302,427 have given a detailed description of an improved version of the process. These patents are incorporated herein by reference thereto.

Stated briefly, the process involves countercurrent extraction (the primary extraction) of green acid with a mixture of aliphatic hydrocarbon (usually kerosene), di(2-ethylhexyl)phosphoric acid (DEPA) and trioctyl phosphine oxide (hereinafter designated the kerosene mixture) which separates substantially all of the uranium. Green acid is partially purified wet process acid resulting from the removal of insolubles and dark colored organic bodies. The green acid is named from its color which results from metallic impurities, principally iron, which may be present at 10–12 g/l. Prior to the primary extraction, the green acid is treated with an oxidizing agent, usually hydrogen peroxide, to convert any $U^{+4}$ to $U^{+6}$ and any $Fe^{+2}$ to $Fe^{+3}$. The primary extraction is now carried out and the $U^{+6}$ passes into the kerosene phase.

The uranium is now separated from the kerosene mixture in another extraction step (usually designated as the stripping step) using as the stripping agent phosphoric acid containing ferrous ion in sufficient amount to reduce $U^{+6}$ to $U^{+4}$. The reduced uranium ion is insoluble in the kerosene mixture but is soluble in the phosphoric acid stripping agent into which it passes. The phosphoric acid stripping agent containing the uranium is once again treated to an oxidation step to convert the $U^{+4}$ to $U^{+6}$ and once again the uranium is extracted with the kerosene mixture (the secondary extraction). The resulting kerosene solution containing the uranium is then extracted with an aqueous ammonium carbonate solution (known as the alkaline strip solution). The uranium in the kerosene mixture is converted at the interface to ammonium uranyl tricarbonate (AUT) which passes into the aqueous phase. The AUT is then further processed to produce a dry uranium concentrate.

The process has been very successful in separating uranium from wet process phosphoric acid, but there are some problems associated with the process. One of these problems involves DEPA. When the kerosene mixture is contacted with the ammonium carbonate, some of the DEPA is converted to the water soluble ammonium salt which passes into the aqueous phase along with the AUT. As much as 0.1% or more may be present. Later in the process, this aqueous phase is acidified to about pH 2 to destroy the carbonate ion thereby forming carbon dioxide. In so doing the DEPA is displaced from its ammonium salt back to the acid and forms an insoluble waxy layer at the surface of the liquid and on the walls of the reactor. Also, the DEPA objectionably re-extracts some of the uranium from the solution. During the acidification step, air is passed through the solution to sweep out the carbon dioxide as it forms. The sparging air and carbon dioxide in the presence of the DEPA results in an uncontrollable foam which is rich in uranium so it must be recycled to recover uranium values.

Berry et al proposed as a solution to the problem of DEPA that the AUT solution, either before or after acidification, be treated with a water-immiscible organic solvent (such as a petroleum hydrocarbon). After separating with hydrogen peroxide to oxidize and precipitate the uranium as uranyl peroxide. Removal of DEPA by the organic solvent proved quite successful, but disadvantageously it involved another extraction step and the DEPA carried with it uranium values. Accordingly, there is still a need for an improved process to eliminate the foaming problem caused by the DEPA.

SUMMARY OF THE INVENTION

It is an object of this invention to provide an improved process for the recovery of uranium from wet process phosphoric acid.

It is another object of this invention to provide an improved process for the recovery of uranium from wet process phosphoric acid by preventing the development of uranium-rich DEPA foam.

Other objects of this invention will be apparent to those skilled in the art from the disclosure herein.

It is the discovery of this invention to provide an improved process for the recovery of uranium from wet process phosphoric acid by treating the aqueous phase containing ammonium uranyl tricarbonate (AUT) and ammonium salt of DEPA with activated carbon whereby the ammonium DEPA is adsorbed and separated from the aqueous AUT solution. The latter is then acidified according to the previous process without encountering the troublesome foam and problems associated therewith. The adsorbed ammonium DEPA can be recovered from the activated carbon and recycled to the primary or secondary extraction.

DETAILED DESCRIPTION

The improvement step of this invention can be carried out by contacting the alkaline strip solution containing the ammonium DEPA with activated carbon by any effective means, many of which are known in the art. One effective and preferred means is to prepare a column of activated carbon and pass the alkaline strip solution through it. In a preferred embodiment, the process is operated on a continuous basis. At least two or more carbon-packed columns are provided and when one column becomes exhausted, as determined by periodic analysis of the effluent, the feed is switched to the other column.

The activated carbon useful for the practice of this invention can be derived from bituminous coal, lignite, peat, coconut shells, from wood sources or from petroleum acid sludge, or coke and need not have any particular pore size or mesh size. However, powdered carbon is preferred. Generally, the so-called liquid phase activated carbons are preferred since their pore size distribution is sufficiently large to allow for easy access of liquids to the interior of the pores. The more preferred activated carbons have a total surface area of 500–1200

$m^2/g$. One such carbon is sold as Calgon CP-131 and another as Witco 950. It is understood, however, that the practice of this invention is not limited to these two products.

The amount of activated carbon employed has no upper limit, of course, but it should be at least 0.5 g per 100 ml of solution to be treated, preferably about 1-2.5, depending on the grade of activated carbon used. In most cases, a residence time of from 15-30 minutes in contact with the activated carbon is usually satisfactory.

The regeneration of an activated carbon is effected by treating the carbon with ammonium hydroxide solution, e.g. of about 5-15% concentration. The bed of carbon to be regenerated is drained of its contents and refilled with the ammonium hydroxide solution. Air is sparged in a low volume to provide light agitation for a few minutes, e.g. 10-20 minutes, after which the carbon is allowed to settle. Ammonium hydroxide is then passed slowly through the column or bed of activated carbon for 15-30 minutes before returning it to service.

The discovery of a method of separating the ammonium salt of DEPA from the AUT solution prior to acifidication surprisingly leads to the following benefits and cost savings:
1. Elimination of the DEPA-uranium foam recycle stream,
2. Less sulfuric acid is needed for the acidification step,
3. Elimination of entrained organic carryover to the uranium refinery,
4. Elimination of product amenability problems,
5. Lower usage of hydrogen peroxide to recover recycled uranium.

The invention will be better understood with reference to the following examples. It is understood that these examples are intended only to illustrate the invention and it is not intended that the invention be limited thereby.

EXAMPLE 1

A quantity of Calgon DP-131 activated carbon was ground to pass a 325 mesh screen. The properties are listed in Table 1.

TABLE 1

|  | Calgon DP-131 | Witco 950 |
|---|---|---|
| Density, g/cc | 0.424 | 0.533 |
| Working Capacity, g/100 ml | 6.5 | 5.03 |
| Butane Number, cc/g C | 0.511 | 0.390 |
| Butane Retention, cc/g C | 0.2333 | 0.2297 |
| Iodine Number | 1202 | 1008 |
| Surface area, $m^2/g$ | 1207 | 968 |
| 10Å-28Å, $m^2/g$ | 861 | 851 |
| Micropore Volume, cc/g | 0.616 | 0.483 |

A quantity of loaded ammonium carbonate solution was obtained from uranium recovery operations. It analyzed 21.4 g/l of uranium, 92 ppm of $P_2O_5$, 3 ppm of ferric iron, 53 ppm of fluorine and 2098 ppm of DEPA (0.2188 g/100 ml). Aliquots of 100 ml were delivered to each of eight beakers and activated carbon was added in amounts of from 0.05 to 10 g respectively. The contents of each beaker was mixed for two hours with a magnetic stirrer and were then filtered. Ambient temperature was 80° F. The filtrates were analyzed for DEPA. The results are as follows:

TABLE 2

| Carbon g | DEPA g/100 ml | Ratio DEPA/C |
|---|---|---|
| 0.00 | 0.2188 | — |
| 0.05 | 406 | 3.56 |
| 0.10 | 419 | 1.77 |
| 0.20 | 239 | 0.97 |
| 0.50 | 57 | 0.43 |
| 1.00 | 11 | 0.22 |
| 2.50 | 02 | 0.09 |
| 5.00 | 03 | 0.04 |
| 10.00 | 03 | 0.02 |

EXAMPLE 2

The experiment of Example 1 was carried out in all essential details except that Witco 950 activated carbon was substituted for the Calgon DP-131.

The results of the adsorption tests are as follows:

TABLE 3

| Carbon g | DEPA g/100 ml | Ratio DEPA/C |
|---|---|---|
| 0.00 | 0.2188 | — |
| 0.05 | 0.0399 | 3.56 |
| 0.10 | 0.0397 | 1.79 |
| 0.20 | 0.0129 | 1.03 |
| 0.50 | 0.0374 | 0.36 |
| 1.00 | 0.0004 | 0.22 |
| 2.50 | 0 | 0.09 |
| 5.00 | 0 | 0.04 |

EXAMPLE 3

A 1-liter glass column equipped with a water jacket was filled approximately three quarters full with a measured and weighed amount of Calgon DP-131 carbon. It was covered with an aqueous solution of ammonium carbonate, 0.5M, and allowed to soak for 16 hours. All tubing and piping was similarly filled. After the soaking period, the system was heated to 120° F. and the ammonium carbonate was circulated in a closed loop.

A quantity of loaded alkaline strip solution (i.e., the ammonium uranyl tricarbonate solution) was obtained from the uranium plant. It was introduced into the carbon column at a rate of 170 ml/minute until it was determined that the adsorption of DEPA was substantially complete. The column was then drained.

The column was filled with 9% ammonium hydroxide and air was sparged through the column for 15 minutes. The air flow was then stopped and the carbon was allowed to settle for 30 minutes. Circulation of the ammonium hydroxide in a closed loop circuit, downwardly over the carbon, was then commenced at a rate of 250 ml/minute. When the carbon bed was satisfactorily regenerated, the ammonium hydroxide was replaced with ammonium carbonate solution and the column was again used to adsorb DEPA.

I claim:

1. A process for separation of the ammonium salt of di(2-ethylhexyl)phosphoric acid from an aqueous solution of ammonium uranyl tricarbonate containing said salt as an impurity comprising the steps of contacting said solution with activated carbon in an amount of at least about 0.5 to 2.5 g or more per 100 ml of solution.

2. The process of claim 1 wherein the di(2-ethylhexyl) phosphoric acid is recovered by treating the activated carbon with ammonium hydroxide.

* * * * *